(12) United States Patent
Marquardt et al.

(10) Patent No.: US 10,716,188 B2
(45) Date of Patent: Jul. 14, 2020

(54) ADAPTIVE OPTICAL DISTRIBUTION SYSTEM

(71) Applicant: ABL IP HOLDING LLC, Atlanta, GA (US)

(72) Inventors: Craig Eugene Marquardt, Covington, GA (US); Daniel Aaron Weiss, Atlanta, GA (US); Jie Chen, Snellville, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/381,902

(22) Filed: Apr. 11, 2019

(65) Prior Publication Data
US 2019/0239316 A1 Aug. 1, 2019

Related U.S. Application Data

(63) Continuation of application No. 15/291,150, filed on Oct. 12, 2016, now Pat. No. 10,278,260, which is a
(Continued)

(51) Int. Cl.
H05B 47/175 (2020.01)
H05B 47/105 (2020.01)
H05B 45/10 (2020.01)
H05B 47/11 (2020.01)
H05B 47/18 (2020.01)
(Continued)

(52) U.S. Cl.
CPC ............ *H05B 47/105* (2020.01); *F21S 8/086* (2013.01); *H05B 45/10* (2020.01); *H05B 47/11* (2020.01); *H05B 47/175* (2020.01); *H05B 47/18* (2020.01); *H05B 47/185* (2020.01); *H05B 47/19* (2020.01); *F21V 5/04* (2013.01);
(Continued)

(58) Field of Classification Search
CPC combination set(s) only.
See application file for complete search history.

(56) References Cited

U.S. PATENT DOCUMENTS 8,502,131 B2 * 8/2013 Hirose .................. H01L 27/144
250/226
8,582,034 B2 * 11/2013 Kwong .................. H04N 17/04
348/180
(Continued)

FOREIGN PATENT DOCUMENTS

EP 1722157 11/2006
EP 1916468 4/2008
(Continued)

OTHER PUBLICATIONS

EP14159953.0, "Office Action," dated Jul. 18, 2019, 8 pages.
(Continued)

*Primary Examiner* — Adam D Houston
(74) *Attorney, Agent, or Firm* — Kilpatrick Townsend & Stockton LLP

(57) ABSTRACT

A luminaire may include a plurality of different light engines. Light engines having different light distributions can be included in a single luminaire and a subset of the light engines selectively driven to dynamically change the light distribution of the luminaire. In this way, a single luminaire is capable of illuminating an area with a variety of different light distributions.

16 Claims, 14 Drawing Sheets

Related U.S. Application Data continuation of application No. 14/883,878, filed on Oct. 15, 2015, now Pat. No. 9,497,833, which is a continuation of application No. 13/829,869, filed on Mar. 14, 2013, now Pat. No. 9,192,029.

(51) Int. Cl.
| | | |
|---|---|---|
| *H05B 47/19* | (2020.01) | |
| *H05B 47/185* | (2020.01) | |
| *F21S 8/08* | (2006.01) | |
| *F21Y 115/10* | (2016.01) | |
| *F21V 5/04* | (2006.01) | |
| *F21W 131/103* | (2006.01) | |

(52) U.S. Cl.
CPC .... *F21W 2131/103* (2013.01); *F21Y 2115/10* (2016.08); *Y02B 20/72* (2013.01)

(56) References Cited

U.S. PATENT DOCUMENTS

| | | | | |
|---|---|---|---|---|
| 8,662,704 B2* | 3/2014 | Carraher | ............... | F21S 8/08 362/242 |
| 8,729,446 B2* | 5/2014 | Verfuerth | ............. | G08G 1/0116 250/205 |
| 8,872,432 B2* | 10/2014 | Kercso | ................. | H05B 47/105 315/152 |
| 9,192,026 B2 | 11/2015 | Marquardt et al. | | |
| 9,192,029 B2 | 11/2015 | Marquardt et al. | | |
| 9,497,833 B2 | 11/2016 | Marquardt et al. | | |
| 10,278,260 B2 | 4/2019 | Marquardt et al. | | |
| 2002/0159274 A1* | 10/2002 | Hubbell | ................. | H05B 47/10 362/555 |
| 2005/0237208 A1* | 10/2005 | Wojcik | ................ | A01M 31/002 340/573.2 |
| 2006/0139918 A1 | 6/2006 | Dolgin et al. | | |
| 2006/0291204 A1 | 12/2006 | Marka et al. | | |
| 2007/0043540 A1* | 2/2007 | Cleland | ................. | H05B 47/22 702/188 |
| 2008/0173790 A1* | 7/2008 | Cheng | ..................... | G01V 8/14 250/206 |
| 2008/0174429 A1* | 7/2008 | Jensen | ................ | G08B 13/193 340/565 |
| 2009/0278035 A1* | 11/2009 | Chen | .................. | H01L 31/0203 250/239 |
| 2010/0109934 A1* | 5/2010 | Drake | ................. | H05B 47/105 342/28 |
| 2010/0118531 A1* | 5/2010 | Montagne | .......... | G02B 27/0955 362/235 |
| 2010/0202140 A1* | 8/2010 | Rooymans | ................ | F21V 7/09 362/231 |
| 2010/0296285 A1* | 11/2010 | Chemel | ................ | F21V 23/003 362/235 |
| 2010/0302780 A1* | 12/2010 | Liu | ......................... | F21S 8/086 362/249.06 |
| 2010/0327766 A1* | 12/2010 | Recker | ................. | H05B 45/00 315/291 |
| 2011/0019405 A1* | 1/2011 | Tsao | ......................... | F21S 8/086 362/235 |
| 2011/0134638 A1* | 6/2011 | Wang | .................... | F21V 7/0008 362/247 |
| 2012/0020060 A1* | 1/2012 | Myer | ...................... | F21V 14/02 362/183 |
| 2012/0038281 A1* | 2/2012 | Verfuerth | ................ | H05B 41/36 315/152 |
| 2012/0038490 A1* | 2/2012 | Verfuerth | ............. | G08G 1/0145 340/910 |
| 2012/0043889 A1* | 2/2012 | Recker | .................. | H05B 47/19 315/86 |
| 2012/0143383 A1* | 6/2012 | Cooperrider | ............ | H02J 3/383 700/295 |
| 2012/0146788 A1* | 6/2012 | Wilson | .................. | G08B 13/187 340/539.23 |
| 2012/0212138 A1 | 8/2012 | Jungwirth et al. | | |
| 2012/0227570 A1* | 9/2012 | Chang | .................. | G10H 1/0083 84/464 R |
| 2012/0243226 A1* | 9/2012 | Wang | .................... | F21V 7/0008 362/247 |
| 2012/0293309 A1* | 11/2012 | Spiro | ...................... | F21V 27/00 340/12.32 |
| 2012/0319616 A1* | 12/2012 | Quilici | .................... | F21V 5/008 315/294 |
| 2013/0176292 A1* | 7/2013 | Li | ........................... | G09G 3/001 345/207 |
| 2013/0193856 A1 | 8/2013 | Chalmers et al. | | |
| 2013/0214930 A1* | 8/2013 | Shiraishi | .................. | G01V 8/20 340/691.6 |
| 2013/0232003 A1* | 9/2013 | Yeo | ...................... | G06Q 30/0251 705/14.49 |
| 2013/0241420 A1* | 9/2013 | Bal Zs | ................. | H05B 47/105 315/154 |
| 2013/0249436 A1* | 9/2013 | Nishigaki | ............... | H05B 47/10 315/297 |
| 2013/0258488 A1* | 10/2013 | Hatakeyama | .......... | B60K 35/00 359/630 |
| 2013/0300305 A1* | 11/2013 | Wray | ..................... | H05B 45/37 315/210 |
| 2013/0300316 A1* | 11/2013 | Engel-Hall | ............ | H05B 47/10 315/307 |
| 2013/0342131 A1* | 12/2013 | Recker | ................. | H05B 47/105 315/292 |
| 2014/0071677 A1* | 3/2014 | Pickard | .................... | F21S 8/086 362/249.02 |
| 2014/0132390 A1* | 5/2014 | Loveland | ............. | H05B 47/105 340/5.8 |
| 2014/0218922 A1* | 8/2014 | Kim | ........................ | F21S 8/086 362/249.02 |
| 2014/0265873 A1* | 9/2014 | Marquardt | ........... | H05B 47/105 315/153 |
| 2014/0265874 A1* | 9/2014 | Marquardt | ........... | H05B 47/185 315/153 |
| 2015/0061504 A1* | 3/2015 | Krall | ...................... | H05B 47/11 315/151 |
| 2015/0086213 A1* | 3/2015 | Pederson | ......... | G08B 13/19647 398/128 |
| 2015/0092408 A1* | 4/2015 | Wallach | ............... | H05B 47/105 362/233 |
| 2015/0193934 A1* | 7/2015 | Fuchikami | .............. | G06F 3/017 348/142 |
| 2015/0292884 A1* | 10/2015 | Fuchikami | ............. | H04N 5/232 348/135 |
| 2016/0037612 A1 | 2/2016 | Marquardt et al. | | |
| 2016/0052762 A1* | 2/2016 | Swift | ..................... | B60Q 5/005 340/425.5 |
| 2016/0244988 A1* | 8/2016 | Barcelos | ................ | E04H 4/1654 |
| 2016/0255697 A1* | 9/2016 | Bhide | ..................... | F21K 9/232 315/161 |
| 2017/0034891 A1 | 2/2017 | Marquardt et al. | | |
| 2017/0188439 A1* | 6/2017 | Martinez | ................ | G08C 17/02 |
| 2017/0251536 A1* | 8/2017 | Deixler | ................. | H05B 47/105 |
| 2017/0328777 A1* | 11/2017 | Zeckendorf | ............... | G01J 5/34 |
| 2017/0347168 A1* | 11/2017 | Kim | ........................ | H04W 4/80 |
| 2017/0374722 A1* | 12/2017 | Beiner | ................... | H05B 47/18 |
| 2018/0070432 A1* | 3/2018 | Martinez | .................. | F21S 4/24 |
| 2018/0119979 A1* | 5/2018 | Reed | .................... | G05B 15/02 |
| 2018/0124895 A1* | 5/2018 | Alexander | ............ | G06F 3/04883 |
| 2018/0146531 A1* | 5/2018 | Rinko | .................. | F21V 23/0442 |
| 2018/0177021 A1* | 6/2018 | Roberge | ............. | H02J 13/00007 |
| 2019/0098725 A1* | 3/2019 | Sadwick | .................. | H05B 45/20 |

FOREIGN PATENT DOCUMENTS

| | | |
|---|---|---|
| EP | 2425678 | 3/2012 |
| WO | 9833007 | 7/1998 |
| WO | 2007003038 | 1/2007 |
| WO | 2010096066 | 8/2010 |
| WO | 2010125325 | 11/2010 |
| WO | 2012090113 | 7/2012 |

(56) References Cited

FOREIGN PATENT DOCUMENTS

OTHER PUBLICATIONS

U.S. Appl. No. 13/829,682, "Non-Final Office Action," dated Mar. 4, 2015, 14 pages.
U.S. Appl. No. 13/829,682, "Notice of Allowance," dated Aug. 17, 2015, 8 pages.
U.S. Appl. No. 13/829,869, "Amendment for U.S. Patent Application No.," dated Jul. 6, 2015, 9 pages.
U.S. Appl. No. 13/829,869, "Non-Final Office Action," dated Apr. 3, 2015, 8 pages.
U.S. Appl. No. 13/829,869, "Notice of Allowance," dated Jul. 22, 2015, 7 pages.
U.S. Appl. No. 14/883,878, "Amendment and Response to Non-Final Office Action," dated Jul. 22, 2016, 5 pages.
U.S. Appl. No. 14/883,878, "Non-Final Office Action," dated Apr. 22, 2016, 6 pages.
U.S. Appl. No. 14/883,878, "Notice of Allowance," dated Sep. 8, 2016, 7 pages.
U.S. Appl. No. 15/291,150, "Non-Final Office Action," dated Jul. 11, 2018, 9 pages.
U.S. Appl. No. 15/291,150, "Notice of Allowability," dated Jan. 5, 2019, 8 pages.
U.S. Appl. No. 15/291,150, "Notice of Allowance," dated Dec. 17, 2018, 11 pages.
EP14159953.0, "Extended European Search Report," dated Dec. 11, 2014, 7 pages.
EP14159953.0, "Office Action," dated Jan. 19, 2015, 2 pages.
EP14159953.0, "Office Action," dated Sep. 13, 2016, 5 pages.
EP14159953.0, "Office Action," dated Sep. 25, 2017, 6 pages.
EP14159880.5. "Office Action," dated Sep. 25, 2017, 6 pages.
EP14159880.5, "Extended European Search Report," dated Jul. 2, 2014, 5 pages.
EP14159880.5, "Office Action," dated Nov. 30, 2015, 3 pages.

\* cited by examiner

ADAPTIVE OPTICAL DISTRIBUTION SYSTEM

CROSS-REFERENCE TO RELATED APPLICATIONS

This application is a continuation of U.S. application Ser. No. 15/291,150, filed Oct. 12, 2016, entitled "Adaptive Optical Distribution System," issued as U.S. Pat. No. 10,278,260 on Apr. 30, 2019, which is a continuation of U.S. application Ser. No. 14/883,878, filed on Oct. 15, 2015, entitled "Adaptive Optical Distribution System," issued as U.S. Pat. No. 9,497,833 on Nov. 15, 2016, which is a continuation of U.S. application Ser. No. 13/829,869 filed on Mar. 14, 2013, entitled "Adaptive Optical Distribution System," issued as U.S. Pat. No. 9,192,029 on Nov. 17, 2015, all of which are herein incorporated by reference in their entireties.

FIELD

This disclosure relates generally to luminaires having light engines with different optical properties that can be independently driven so as to dynamically change the light distribution of the luminaire.

BACKGROUND

Luminaires typically include at least one light source and an optic positioned to control the light emitted from the light source and thereby dictate the light distribution of the luminaire. Optics for use in luminaires generally include Type I, Type II, Type III, Type IV, or Type V lenses. These lens types are well known in the industry and represent the distribution pattern that light will have when exiting the lenses. Luminaires are fitted with a single set of optics that dictates a pre-specified light distribution from the luminaire. Thus, the luminaire is capable of only emitting that particular light distribution. While the luminance of the luminaire can be dimmed up or dimmed down, this dimming does not affect the distribution pattern of the light emitted from the luminaire, but rather only how intensely the area within that predetermined distribution pattern is illuminated by the luminaire.

Outdoor luminaires are used, for example, to illuminate roadways, parking lots, building exteriors, walk ways, etc. The luminaires can be used for safety and/or security purposes. The optics provided in these luminaires are tailored to create a light distribution prescribed based on the location of the luminaire and the area it is intended to illuminate. Again, however, the luminaires are only capable of emitting a single distribution pattern. To the extent multiple distribution patterns are needed for a particular area, multiple luminaires must be provided.

SUMMARY

Some embodiments of the invention include a luminaire that includes a plurality of different light engines. Light engines having different light distributions can be included in a single luminaire and a subset of the light engines selectively driven to dynamically change the light distribution of the luminaire. In this way, a single luminaire is capable of illuminating an area with a variety of different light distributions.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed to provide an adaptive optical luminaire. Some embodiments of the invention include a luminaire that includes a plurality of different and interchangeable light engines. These light engines can include, among other things, a plurality of light-emitting diodes ("LEDs") and various types of optical elements. The light distribution of each light engine can be altered by varying the number and/or type and/or color of LEDs (or other light source) and/or the optics of each light engine.

Light engines having different distributions can be included in a single luminaire and a subset of the light engines selectively driven to dynamically change the light distribution of the luminaire. In this way, a single luminaire is capable of illuminating an area with a variety of different light distributions.

For example, a roadway luminaire affixed to the top of a pole can include two light engines. One light engine can illuminate one area of the road while another light engine illuminates another area of the road. The light distribution in either area can be independently controlled; for example, by dimming up, dimming down, turning on and/or turning off each light engine. The light engines can be controlled based on any number of parameters. For example, one of the two light engines that produces high angle light (relative to nadir) can be dimmed down in the presence of rain, ice or fog to mitigate veiling glare. And the light engine that produces lower angle light can be dimmed up when the other light engine is dimmed down to ensure that at least portions of the roadway are illuminated but without the high angle problems.

A luminaire with a plurality of independently controlled light engines may also include an environment sensor. In response to environmental parameters received from the environment sensor, the luminaire can dim up, dim down, turn on or turn off one or more light engines. For example, a luminaire may be a roadway luminaire attached to the top of the pole and light from the light engines can be directed downward to illuminate the roadway. In response to the sensor indicating that the roadway is wet due to rain, the luminaire can dim down luminaires that provide high angle light (relative to the vertical) and dim up a light engine that provides low angle light. In this way, the luminaire adaptively adjusts the light distribution based on environmental factors. FIGS. 1-10 collectively demonstrate luminaires having a variety of different light engine configurations capable of creating a variety of different light distributions. By no means is this invention intended to be limited only to the light engine configurations and luminaire distributions disclosed here.

Figure 1:
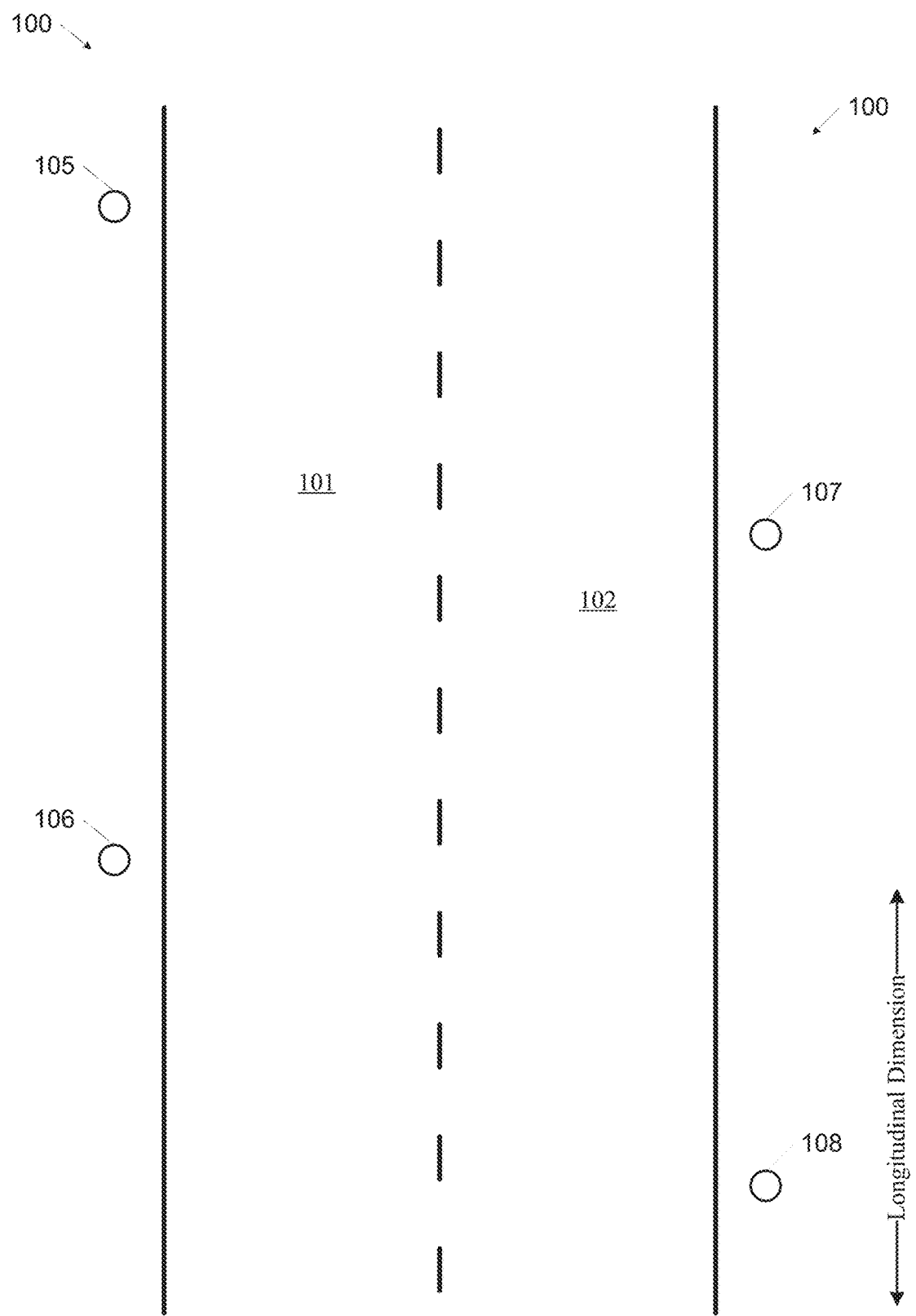
FIG. 1 shows a top view of a street with a plurality of luminaires.

FIG. 1 shows a top view of street 100 with lanes 101, 102 having a plurality of luminaires 105, 106, 107, and 108 disposed to illuminate lanes 101, 102. The plurality of luminaires 105, 106, 107, and 108 are distributed along both sides of the length of street 100. In some embodiments, the luminaires can be distributed on one side of street 100 or any distribution along street 100. Luminaires 105, 106, 107, and 108 can be affixed atop a pole to provide illumination along the length of street 100. The poles can be standard or non-standard street light poles of any height.

Figure 2:
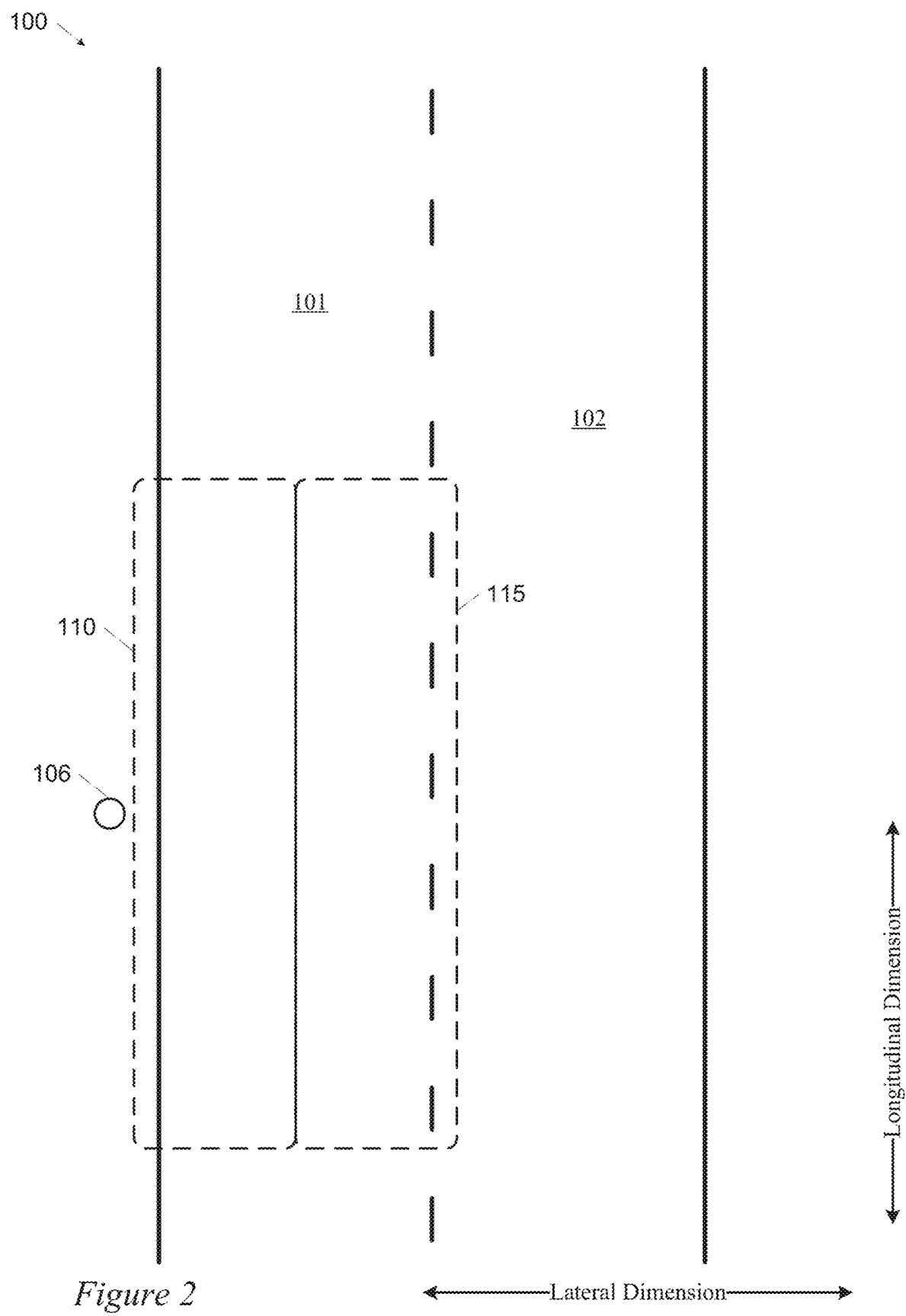
FIG. 2 shows a top view of a street showing a luminaire providing a first light distribution and a second light distribution according to some embodiments of the invention.

FIG. 2 shows a top view of street 100 with luminaire 106 providing inner zone light distribution 110 and outer zone light distribution 115 according to some embodiments of the invention. As will be described in more detail below, luminaire 106 includes at least two light engines. These light engines can be independently and/or separately controlled to provide various light distributions such as inner zone light distribution 110 and outer zone light distribution 115.

One industry standard describes light distributions from a luminaire according to IES type. Longitudinal classifications can include S, M, and L for short, medium, and long longitudinal distributions of light. The size of the distribution is defined by the mounting height (MH). The maximum luminous intensity for a short longitudinal distribution extends up to 2.25 MH in either direction, the maximum luminous intensity for a medium longitudinal distribution extends from the short longitudinal distribution up to 3.75 MH in either direction, and the maximum luminous intensity for a long longitudinal distribution extends from the medium longitudinal distribution up to 3.75 MH in either direction.

According to IES type, the distribution can be described laterally (horizontal in the figure) as type I, II, III, IV or V. The maximum luminous intensity for a type I distribution is located laterally up to 1 MH on both sides of the luminaire (street side and house side). The maximum luminous intensity for a type II distribution is located laterally up to 1.75 MH only on the street side. The maximum luminous intensity for a type III distribution is located laterally up to 2.75 MH only on the street side. The maximum luminous intensity for a type IV distribution is located anywhere beyond 2.75 MH. The type V distribution provides light in a radial pattern.

Returning to FIG. 2, luminaire 106 provides two distinct light distributions. Inner zone light distribution 110 illuminates a portion of the street near luminaire 106 (or the pole the luminaire is affixed to). The light distribution can extend along the length of the street as a short, medium or long light distribution (shown vertically in the figure). The dotted line indicating inner zone light distribution 110 shows the approximate boundaries of the half maximum luminous intensity isocandela trace. Inner zone light distribution may be a type II or type III distribution.

Outer zone light distribution 115 illuminates a portion of the street farther from luminaire 106 (or the pole the luminaire is affixed to). The light distribution can extend along the length of the street as a short, medium or long light distribution (shown vertically in the figure). The dotted line, indicating outer zone light distribution 115, shows the half maximum luminous intensity isocandela trace. Outer zone light distribution may be a type III or type IV distribution.

Outer zone light distribution 115 and inner zone light distribution 110 can overlap in the lateral direction. In some embodiments, the combination of the outer zone light distribution 115 and inner zone light distribution 110 can laterally cover the entire roadway. In some embodiments the combination of outer zone light distribution 115 and inner zone light distribution 110 can produce a relatively uniform illumination distribution across street 100 despite being produced from two separate light engines.

In some embodiments a first light engine can be used to produce outer zone light distribution 115 and a second light engine can be used to produce inner zone light distribution 110. The light sources and/or optics in each light engine may be different to achieve the different light distributions. The first light engine and the second light engine can be separately controlled to illuminate the road with one or both light distributions. Moreover, in some embodiments one light engine may be dimmed down while the other is dimmed up. In some embodiments, both light engines can be dimmed up to illuminate the entire area. In this way, various illumination distributions can be provided in response to various events or inputs.

Figure 3:
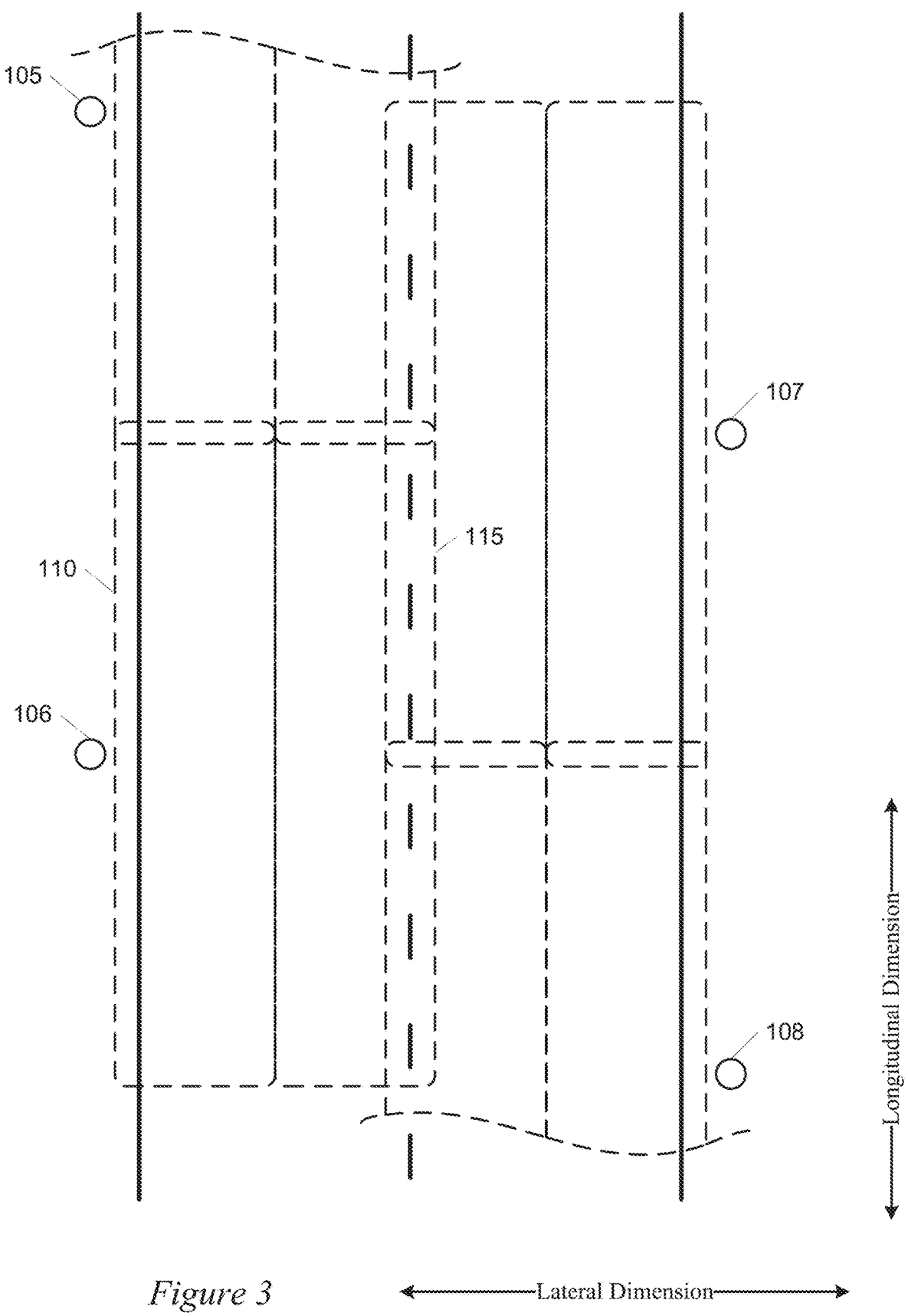
FIG. 3 shows a top view of a street showing a plurality of luminaires each providing two light distributions according to some embodiments of the invention.

FIG. 3 shows a top view of street 100 showing luminaires 105, 106, 107, and 108 with each luminaire providing two light distributions according to some embodiments of the invention.

Figure 4:
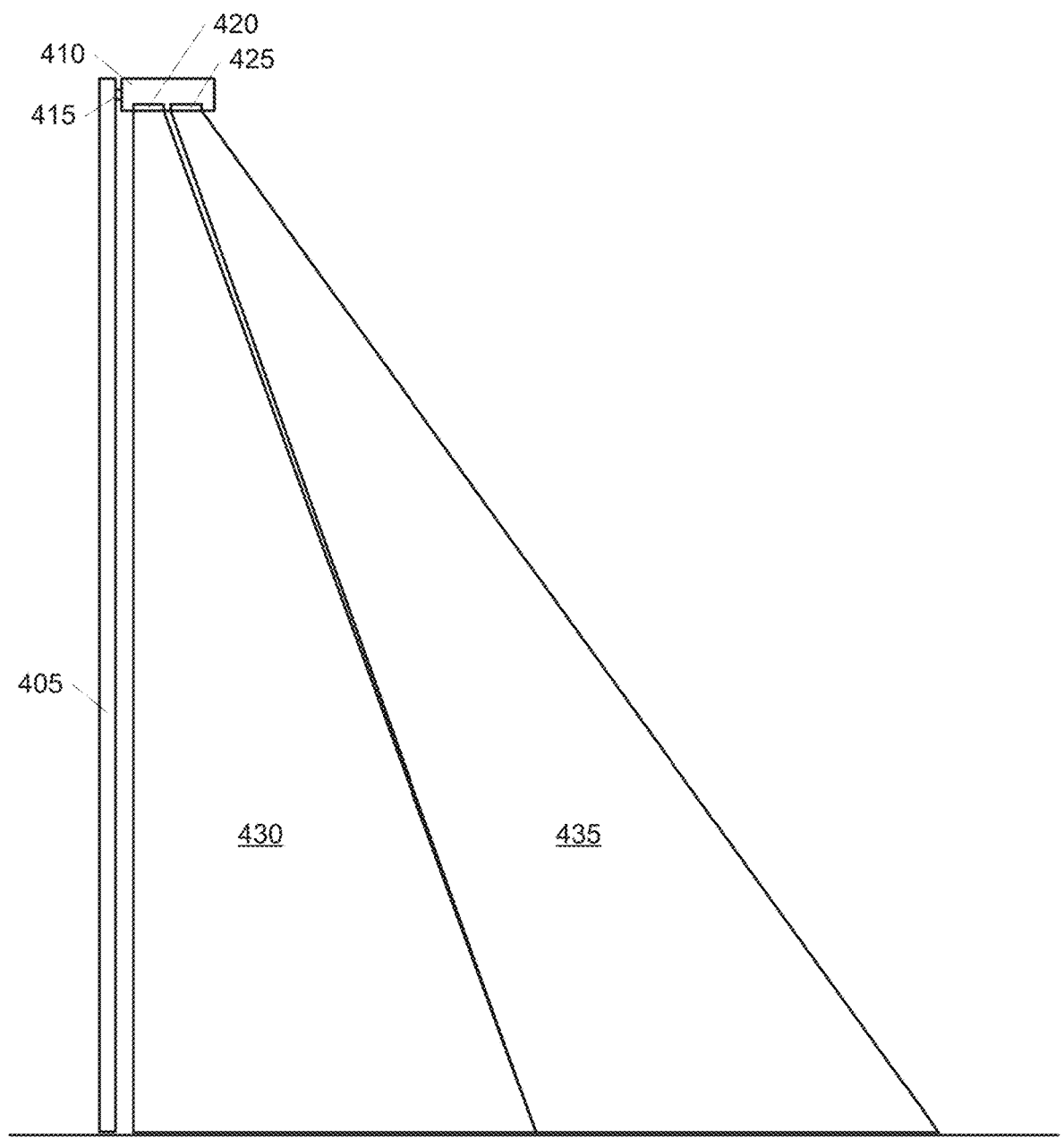
FIG. 4 shows a luminaire atop a pole providing a first light distribution and a second light distribution according to some embodiments of the invention.

FIG. 4 shows a side view of luminaire 410 atop pole 405 providing first light distribution 430 and second light distribution 435 according to some embodiments of the invention. First light distribution 430 can correspond to inner zone light distribution 110 and second light distribution 435 can correspond with outer zone light distribution 115. As shown, light engine 420 can produce light distribution 430, and light engine 425 can produce second light distribution 435.

First light distribution 430 can extend, for example, from approximately nadir (the point on the ground directly below the luminaire) to a first cutoff angle. Second light distribution 435 can extend from the first cutoff angle to a second cutoff angle. The percent of total candlepower above or below a cutoff angle, for example, can be less than 25%, 20%, 15%, 10%, 5%, etc. The first cutoff angle can be about 20°, 25°, 30°, 35°, 40°, etc. The second cutoff angle can be about 30°, 35°, 40°, 45°, 50°, 55°, 60°, 65°, etc. Moreover, first light distribution 430 extends from the initial cutoff angle at substantially nadir to the first cutoff angle. Furthermore, substantially at nadir includes ±2°, ±5°, ±7°, or ±10° from nadir. Often this initial cutoff angle can vary depending on the placement of the luminaire relative to the road or surface being illuminated. These cutoff angles can also refer to maximum illumination angle, which is the angle where the maximum illumination occurs from a given light engine.

Luminaire 410 can be coupled with pole 405 using bracket 415 or other coupling mechanism. In some embodiments, luminaire 410 can be arranged street side relative to pole 405, and the pole can be house side relative to luminaire 410. Pole 405 can be of any height, such as, 20 feet, 30 feet, 40 feet, 50 feet, etc.

Figure 5:
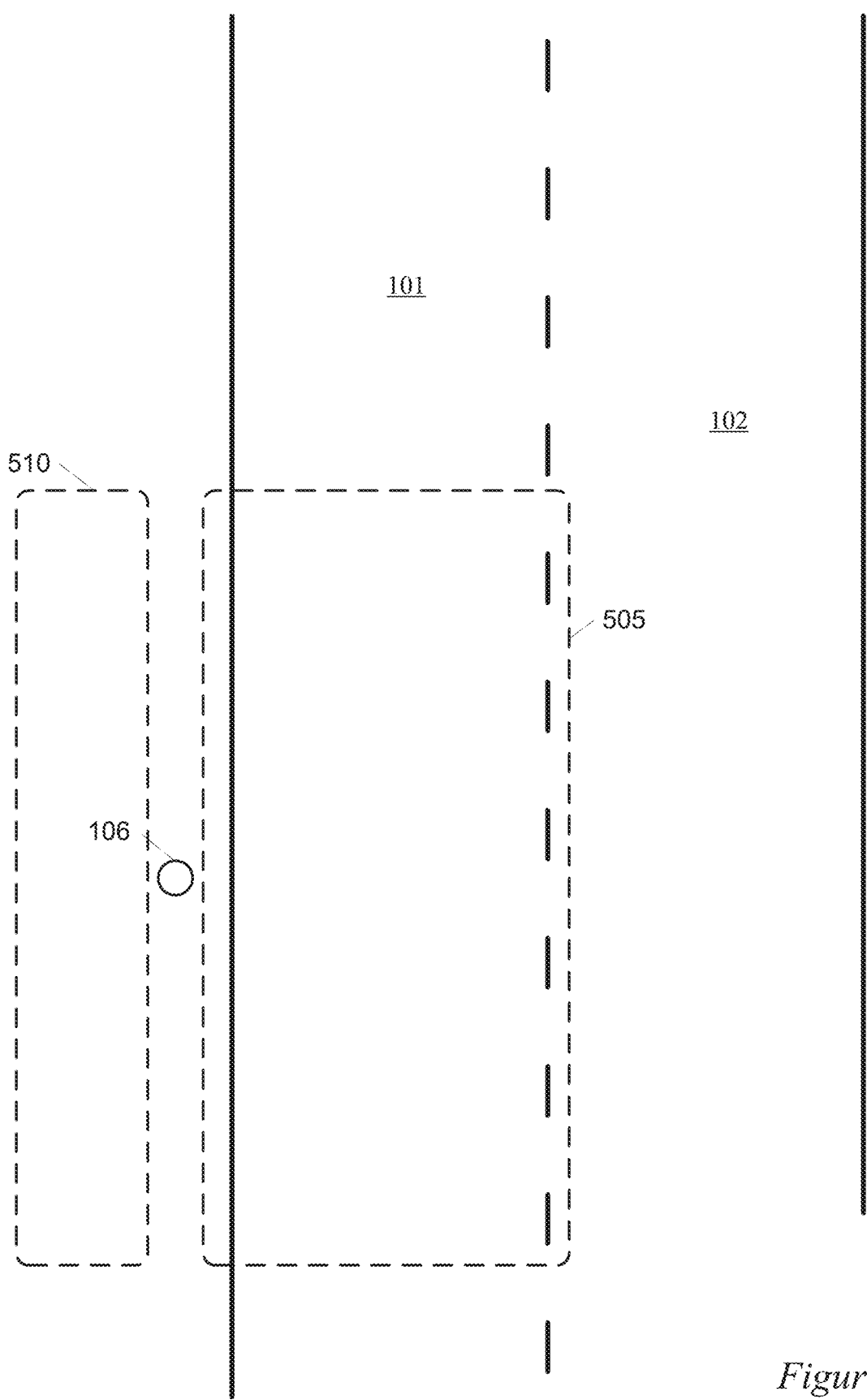
FIG. 5 shows a top view of street showing a luminaire providing a first light distribution and a second light distribution according to some embodiments of the invention.

FIG. 5 shows a top view of street 100 showing luminaire 106 providing light distribution 510 and light distribution 505 according to some embodiments of the invention. Light distribution 510 is a house zone distribution; the light is distributed on the house-side of the luminaire and not on the street side. Light distribution 505 is a full zone light distribution that roughly covers the same area as the collective inner and outer light distributions shown in FIG. 3.

Figure 6:
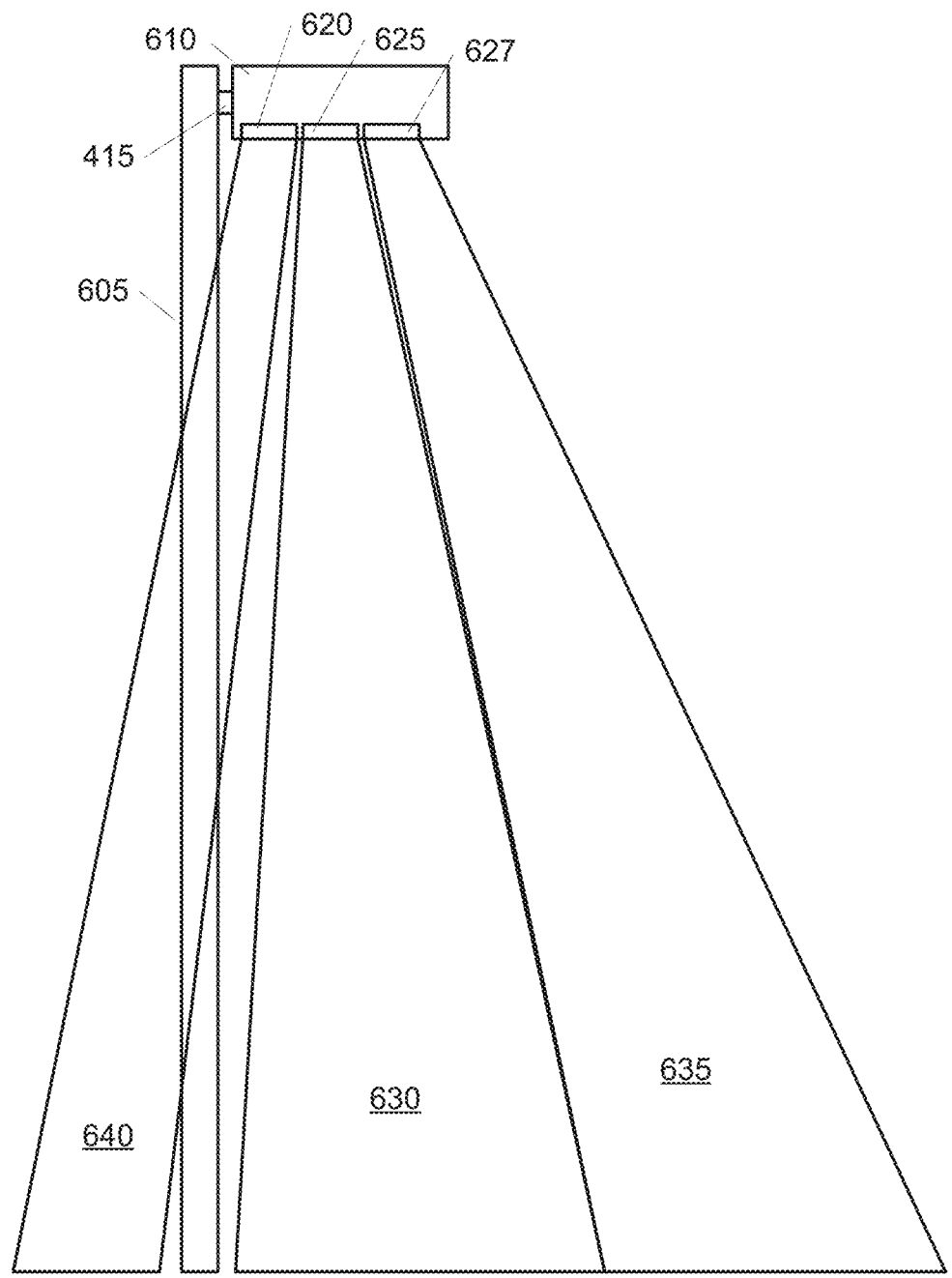
FIG. 6 shows a luminaire atop a pole providing a first light distribution, a second light distribution, and a third light distribution according to some embodiments of the invention.

FIG. 6 shows luminaire 610 affixed atop pole 605 providing light distribution 630, light distribution 635, and light distribution 640 according to some embodiments of the invention. Light engine 620 produces light distribution 640, light engine 625 produces light distribution 630, and light engine 627 produces light distribution 635.

Light distribution 630 can generally correspond with light distribution 430 shown in FIG. 4 and can have the same or different initial cutoff angle and first cutoff angle as described above. Light distribution 635 can generally correspond with light distribution 435 shown in FIG. 4 and can have the same or different first cutoff angle and second cutoff angle as described above.

Light distribution 640 can generally correspond with light distribution 510 in FIG. 5 and can have the same parameters and characteristics. The combination of light distribution 630 and light distribution 635 can correspond with light distribution 505 in FIG. 5 and can have the same parameters and characteristics as these two distributions. Moreover, light distribution 630 can correspond with inner zone light distribution 110 in FIG. 2 and light distribution 635 can correspond with outer zone light distribution 115 in FIG. 2 and can have the same parameters and characteristics.

Figure 7:
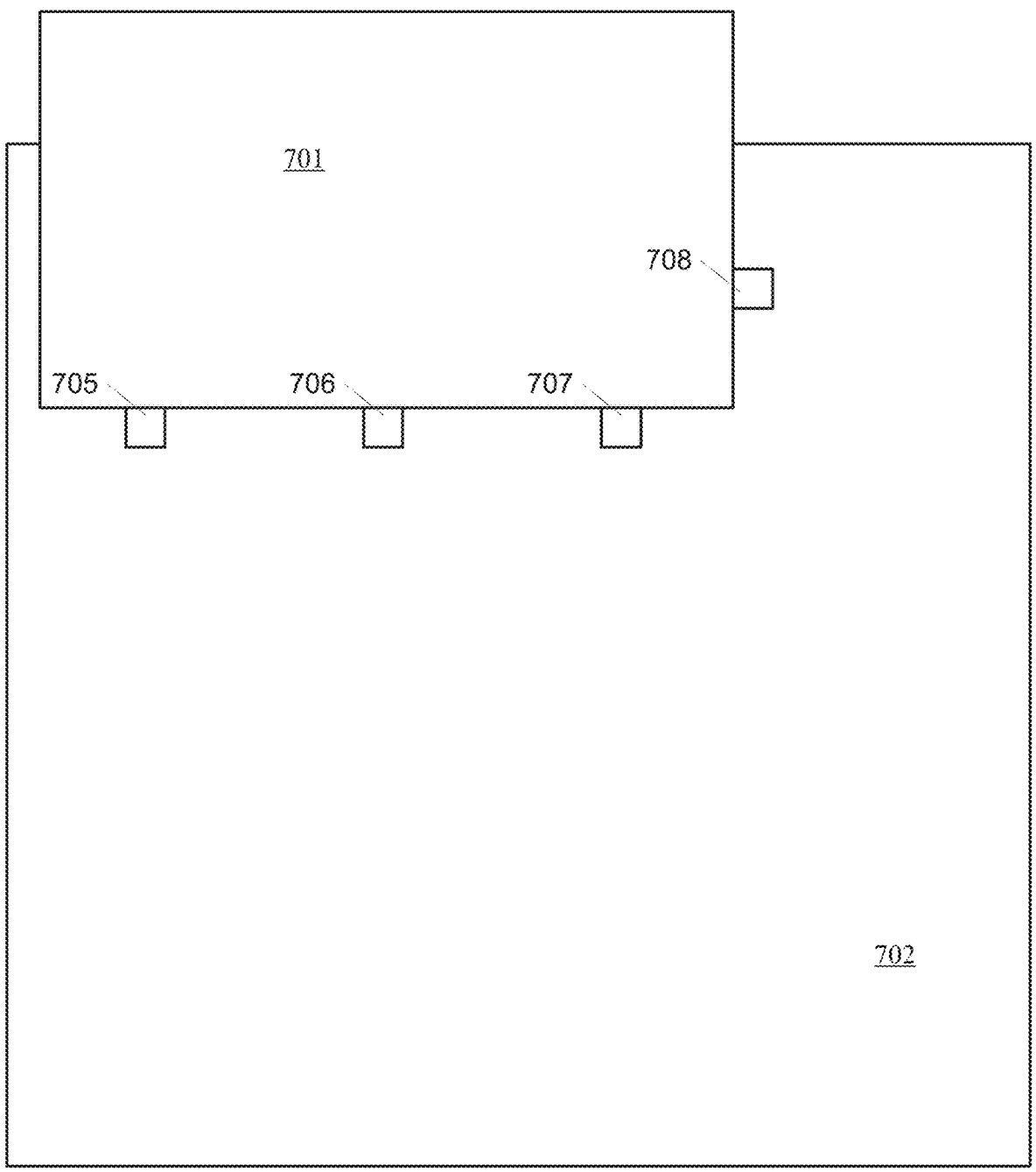
FIG. 7 shows a top view of a parking area surrounding a building with a plurality of luminaires.

FIG. 7 shows a top view of parking area 702 surrounding building 701 with a plurality of luminaires 705, 706, 707 and 708. These luminaires can be mounted on the side of the building or on a pole.

Figure 8:
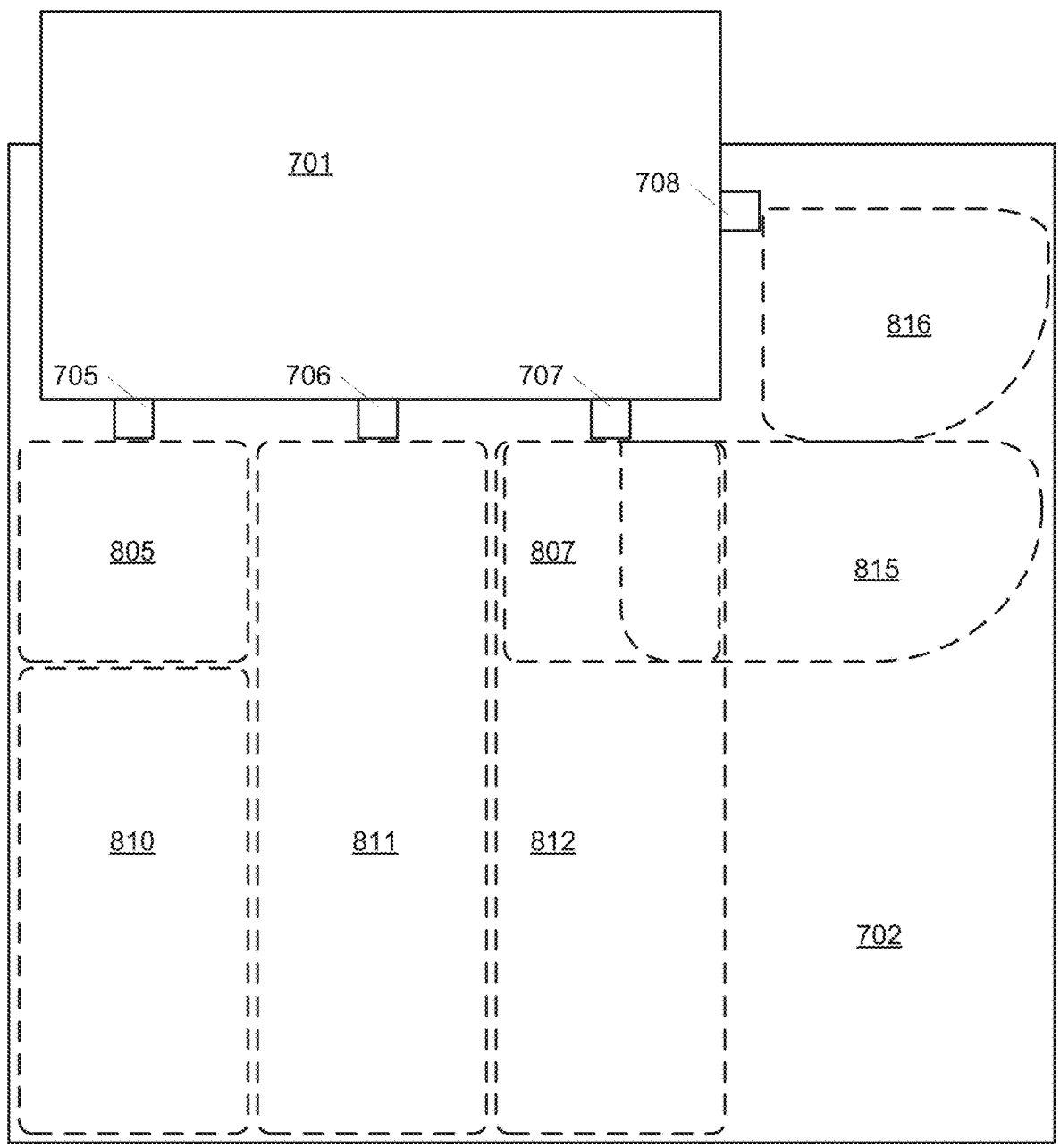
FIG. 8 shows the top view of the parking area with the luminaires providing a variety of light distributions in the parking area according to some embodiments of the invention.
Figure 9A:
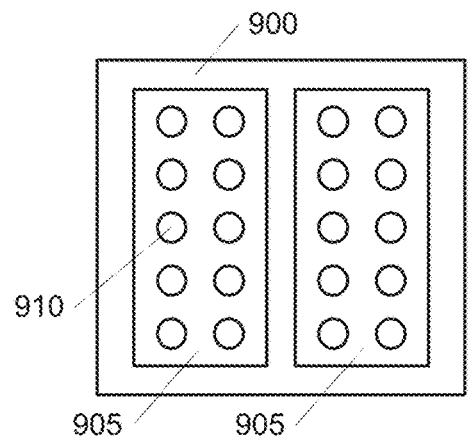
FIGS. 9A-9D show different LED packages arranged within a luminaire according to some embodiments of the invention.
Figure 9B:
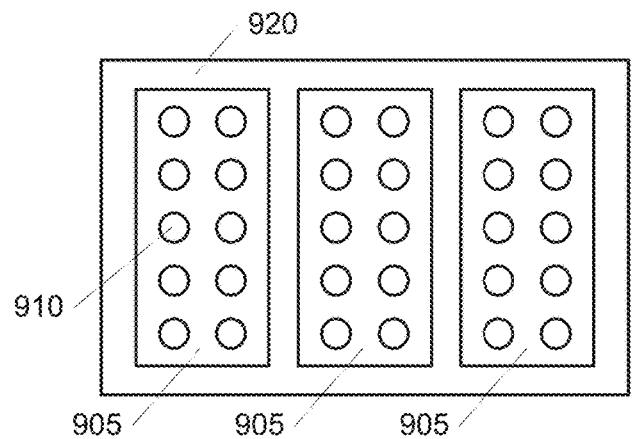
Figure 9C:
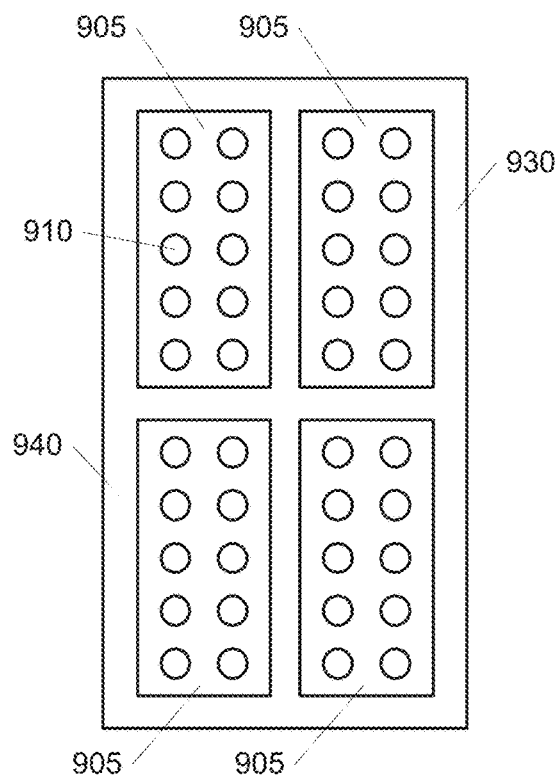
Figure 9D:
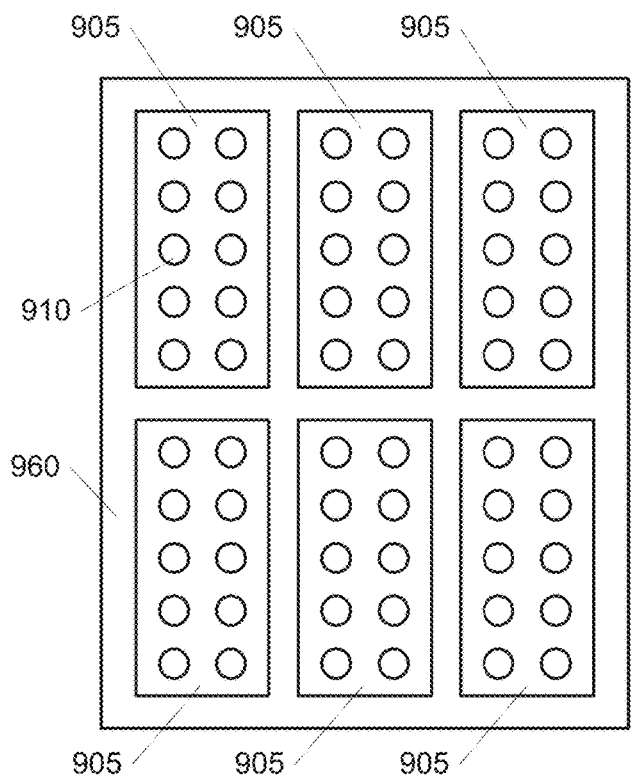

FIG. 8 shows the top view of parking area 702 with luminaires 705, 706, 707 and 708 providing a number of examples of light distributions in parking area 702 according to some embodiments of the invention. Luminaire 705 can illuminate a portion of parking area 702 with inner zone light distribution 805 and outer zone light distribution 810. These two light distributions can be independently controlled and/or operated based on any number of factors.

As another example, luminaire 706 can provide full zone light distribution 811 that extends longitudinally from the luminaire to the edge of parking area 702. Full zone light distribution 811 can be substantially uniform along the length of the distribution. Substantially uniform along the length of the distribution means the luminous intensity on the ground at the farthest end of light distribution is more than half the luminous intensity on the ground near the luminaire.

As another example, luminaire 707 can provide light distribution 812 similar to full zone light distribution 810 and inner zone light distribution 807 that is similar to inner zone light distribution 805. These two light distributions can be used separately or used in combination with each other depending on need or other parameters. Luminaire 707 is also shown as providing quarter zone light distribution 815, which illuminates an area in front of and to the side of luminaire 707.

Figure 14A:
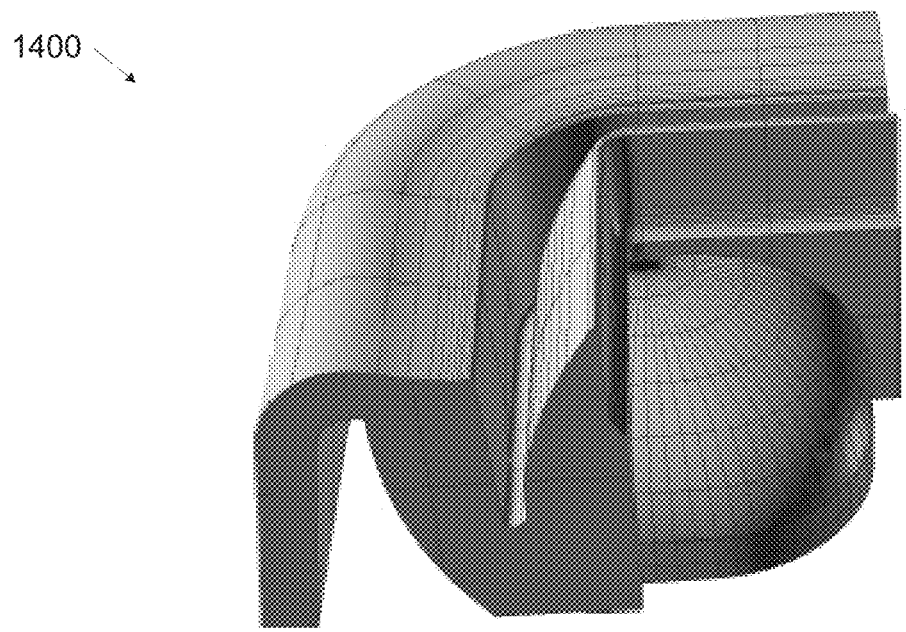
FIG. 14A shows a three-dimensional example of a quarter zone optic according to some embodiments of the invention.
Figure 14B:
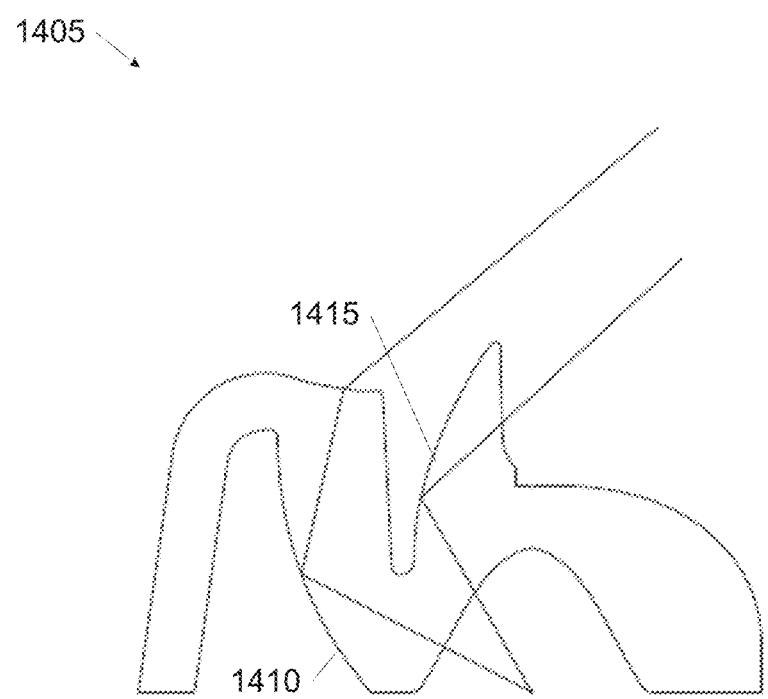
FIG. 14B shows a side view example of a quarter zone optic according to some embodiments of the invention.

Luminaire 708 can provide quarter zone light distribution 816 similar to light distribution 815. Luminaire 708 can be positioned around the side of the building from where luminaires 705, 706, and 707 are positioned. The combination of quarter zone light distribution 816 and/or quarter zone light distribution 815 can illuminate the parking area near the corner of the building. This quarter zone light distribution can be provided using, for example, the quarter zone optic 1400 shown in FIG. 14A. As shown in side view 1405 of FIG. 14B, this optic includes two surfaces 1410 and 1415 where total internal reflection occurs to produce the proper downward light distribution. And the two surfaces include right angle bend in order to produce the quarter zone light distribution.

A luminaire can provide any combination of light distributions shown in FIG. 8. For example, luminaire 706 can provide full zone light distribution 811 and outer zone 810. As another example, luminaire 707 can provide full zone light distribution 811, outer zone 810 and quarter zone light distribution 815. Any other combination of light distributions can be provided.

Embodiments of the invention described in reference to FIGS. 7 and 8 can be applied to various other area illumination applications. For example, such illumination can be applied to event illumination, amphitheater illumination, athletic event illumination, concert illumination, etc.

To provide the different light distributions as shown in the figures, the various luminaires discussed herein can use a variety of different light engines within a single luminaire.

FIGS. 9A, 9B, 9C and 9D each show a luminaire with a number of different combinations of light engines 905 according to some embodiments of the invention. Any type of luminaire is contemplated herein. The luminaire 900 of FIG. 9A includes two light engines 905. The luminaire 920 of FIG. 9B includes three light engines 905. The luminaire 940 of FIG. 9C includes four light engines 905. The luminaire 960 of FIG. 9D includes six light engines 905. While each light engine 905 is shown having ten LEDs 910, any number of LEDs 910 may be used in a light engine 905 and the number/type/color etc. of the LEDs 910 used in each light engine of luminaire 905 can be, but does not have to be, the same. Moreover, the optics of each light engine 905 can be, but in many embodiments will not be, the same. In some embodiments having multiple light engines, the LEDs and optics in a given light engine 905 dictate the light engine light distribution of that light engine. In other embodiments having multiple light engines on a single circuit board the LEDs and optics can vary between different light engines.

Figure 10:
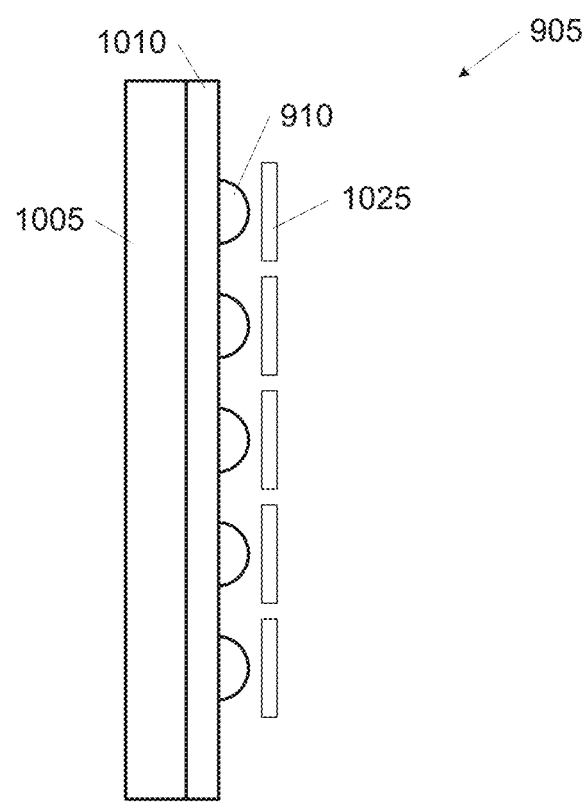
FIG. 10 shows a side view of an LED package according to some embodiments of the invention.

Light engines can have different combinations and/or arrangements of optical elements and/or LEDs to produce different light distributions. Overall, at least some of the light engines 905 within a luminaire 900 will have different light engine distributions. Some or all of the light engines 905 within a luminaire can be separately controlled and/or independently operated so that the light distribution of the luminaire can be altered as desired. Each light engine 905 can include LEDs, heat sinks, power supply interface, and optical elements, for example, as shown in FIG. 10. Each light engine 905 can be interchanged and/or replaced with a different light engine. The optics included on each light engine and/or the type and/or position of LEDs 910 can change the optical distribution produced by the light engine.

FIG. 10 shows a side view of light engine 905 according to some embodiments of the invention. Light engine 905 includes a plurality of LEDs 910 mounted on a printed circuit board 1010. Circuit board 1010 can be, but does not have to be, mounted on a heat sink 1005. One or more optical elements (represented schematically by lenses 1025) are positioned adjacent the LEDs 910 to control the distribution of light emitted from the LEDs 910. Any number or type of optical elements 1025 can be used; for example, extruded or molded lenses, diffusers, collimators, etc. In some embodiments, the optical element 1025 will be an integrally-molded optic with a number of lenses provided therein and positioned over the light sources so that the lenses align with the light sources. In such embodiments, the lenses within a single optic may have different distributions. Optical element 1025 can be selected based in part on the pole height to produce the proper light distribution.

In some embodiments, different light engines with different optics can be disposed on the same circuit board. In some embodiments control and/or power components can be disposed on the same circuit board as LEDs 910. Any combination of the above can be used.

The combination of LEDs and/or optical elements can make light engine 905 an outer zone optics (OZO), quarter zone optics (QZO), full zone optics (FZO), inner zone optics (IZO), street zone optics (SZO), and house zone optics (HZO). Various other optics can be used to produce other illumination distributions.

In some embodiments, the OZO can produce a wide and forward distribution with little light close to the pole; for example, similar to outer zone light distribution 115 shown in FIGS. 2 and 3.

In some embodiments, the IZO is the complement to the OZO. The IZO can be used to produce a light distribution near the luminaire or the pole. For example, inner zone light distribution 110 shown in FIGS. 2 and 3 as well as inner zone light distribution 805 and 807 in FIG. 8 can be made with IZO.

In some embodiments, the QZO can produce a wedge shaped light distribution, with the narrowest part of the wedge closest to the pole. For example, QZO can produce light distribution 815 and/or light distribution 816 shown in FIG. 8.

In some embodiments, the FZO can produce a light distribution on both sides of the pole or luminaire. The FZO, for example, can produce a distribution that is the combination of light distributions 505 and 510 shown in FIG. 5.

In some embodiments, the SZO can produce a light distribution that is a combination of the IZO, OZO, and/or QZO distribution only on the street side (in front of the pole). For example, the SZO can produce light distribution 505 in FIG. 5.

In some embodiments, the HZO can produce a distribution that is similar to the distribution produced by the SZO but it lights only the house side (behind the pole). For example, HZO can produce distribution 510 shown in FIG. 5.

Figure 11:
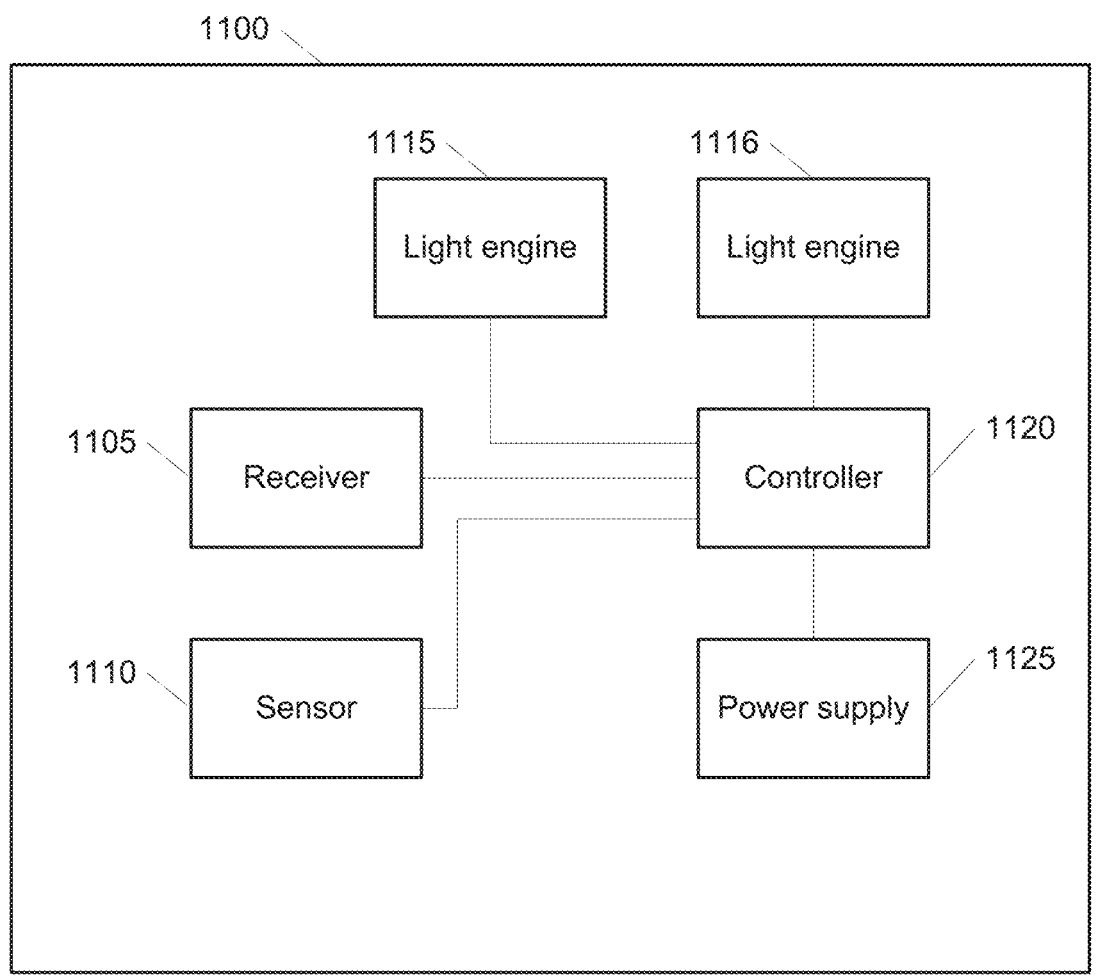
FIG. 11 is a block diagram of the electrical subsystem of a luminaire according to some embodiments of the invention.

FIG. 11 is a block diagram of the electrical subsystem of luminaire 1100 with light engine 1115 and light engine 1116. While light engine 1115 and light engine 1116 are shown, any number or type of light engines may be used. Light engine 1115 produces a first light distribution and light engine 1116 produces a second light distribution different from the first light distribution. The components schematically shown in FIG. 11 may all be disposed within a single luminaire housing. The electrical subsystem can include power supply 1125 and controller 1120. Controller 1120, for example, can control operation of light engine 1115 and light engine 1116. Controller 1120 can turn on, turn off, dim up, or dim down the light sources in an entire light engine 1115, 1116 or alternatively some subset of the light sources with a light engine 1115, 1116. This control, moreover, can be linked to an input from either or both receiver 1105 and sensor 1110. The control over the two light engines can be independent of each other.

Power supply 1125 can directly power light engine 1115 and/or light engine 1116, and/or power supply 1125 can power light engine 1115 and/or light engine 1116 through controller 1120. In some embodiments, controller 1120 can switch and/or modulate power to light engine 1115 and/or light engine 1116. In some embodiments, a separate switch and/or modulator can be used to control power to light engine 1115 and/or light engine 1116. In some embodiments, power supply 1125 can be directly coupled with sensor 1110 and/or receiver 1105, and/or coupled through controller 1120.

Sensor 1110 can be any type of sensor. For example, sensor 1110 can be a rain sensor, temperature sensor, daylight sensor, humidity sensor (e.g., a hydrometer), particle sensor, luminance/illuminance sensors, manual control (e.g. ROAM®), and any other sensor. Sensor 1110 can be communicatively coupled with controller 1120, and can send and receive data with controller 1120.

Receiver 1105 can be any type of wireless receiver without limitation. Receiver 1105 can be any type of radio receiver, for example, receiver 1105 can communicate with a wireless telephone network or gateway, a mobile Internet network, a virtual private network, a satellite receiver, or a standard radio receiver. Receiver 1105 can include an antenna, a digital to analog converter, an amplifier, one or more multiplexers, one or more demultiplexers, etc.

Receiver 1105 can receive input from a remote user, server, or sensor. For example, control information can be sent to the luminaire and/or the controller to execute certain operational functions of the luminaire. For example, receiver 1105 can receive instructions to dim up, dim down, turn on, or turn off certain light engines.

Operation of the light engines within a luminaire can be controlled using predictive controls whereby the luminaire is preprogrammed to operate the light engines in a particular way or reactive controls whereby operation of the light engines are controlled dynamically in response to external inputs.

For example and with reference to FIG. 8, assume that a business operating in building 701 does not close until after dark. Luminaire 705 may be programmed such that the light engines are activated and fully powered to emit both the inner zone light distribution 805 and the outer zone light distribution 810 to fully illuminate the parking lot area 702.

After the business closes and to conserve energy, luminaire 705 may be programmed to turn off at a pre-set time the light engine controlling outer zone light distribution 810 and to dim the light engine controlling with inner zone light distribution 805. A motion sensor may be positioned to detect motion at the periphery of the parking lot area 702. If motion is detected, the luminaire 705 may be configured to receive input from that sensor (discussed below) and, in response, fully activate the light engines creating one or both of the inner zone light distribution 805 and outer zone light distribution 810.

Figure 12:
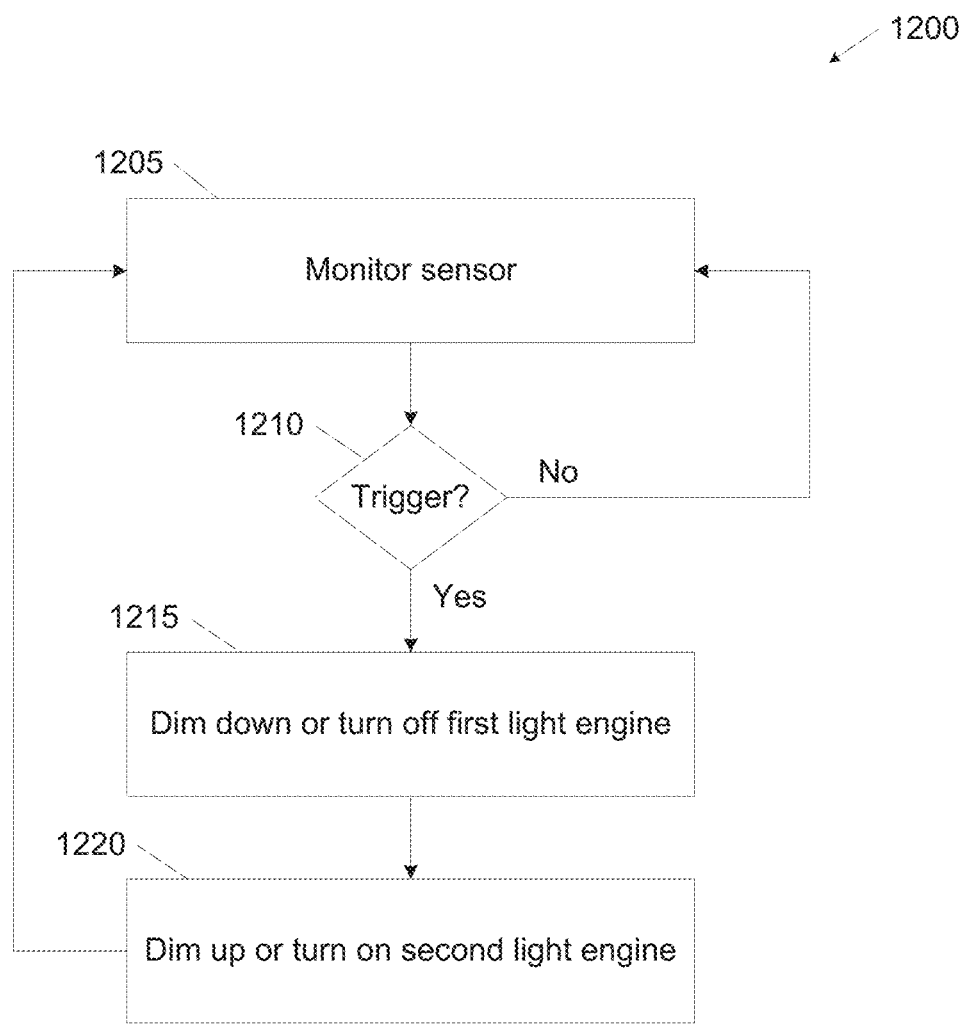
FIG. 12 is a flowchart of a process for changing the light distribution of a luminaire in response to a sensor or other input according to some embodiments of the invention.

FIG. 12 is a flowchart of one embodiments of a process 1200 for altering the light distribution in response to input from a sensor (e.g., sensor 1110) or a combination of sensors. At block 1205, the sensor (or receiver) can be monitored. At block 1210 it can determine whether a trigger event has occurred. For example, controller 1120 can monitor sensor 1110 until a trigger event occurs. A trigger event can occur, for example, when a sensor value exceeds or dips below some predetermined threshold values or when a control instruction is received from a third party through receiver 1105.

A trigger event can be received from a third party for a number of reasons. For example, the police or fire crew may need to change the illumination pattern provided by a luminaire on a road way to investigate a crime, to catch a criminal, or for other safety considerations. This change may need to be made in a localized area of the road. As another example, department of transportation workers may need to change the illumination pattern provided by a luminaire on a roadway as part of a construction project. The third party may have an application executing on their computer system (e.g., laptop, tablet, mobile phone, etc.) that can be used to send a message to receiver 1105 to trigger a change in the illumination pattern provided by the single luminaire.

In response to a trigger event, a first light engine can be activated, dimmed up, dimmed down or turned off at block 1215. A second light engine can be activated, dimmed up, dimmed down or turned on at block 1220. A light engine can be dimmed up, for example, by increasing power to the light sources in the light engine and/or by increasing the number of light engines activated within the light engine. Similarly, a light engine can be dimmed down, for example, by decreasing power to the light sources in the light engine and/or by decreasing the number of light engines activated in the light engine. In some embodiments, a dimmer driver or dimmer switch can be used to either dim up or dim down the lights.

In some embodiments, process 1200 can be used to control operation of light engines 420 and 235 in luminaire 410 in FIG. 4. The process can be triggered when the road surface is wet. This can be determined, for example, using a hydrometer that can sense the humidity in the air. The trigger event can occur, for example, when the humidity measured with the hydrometer is greater than 95% or at 100%. The trigger event can also occur using a photodiode that is positioned in a luminaire to measure reflection off the road surface directly below the luminaire. When the road is wet, the amount of light reflected will be greater than when the road is not wet.

When triggered, light engine 425 can be dimmed down or turned off to reduce high angle reflection off the road surface. In some embodiments, light engine 420 can be dimmed up to compensate for the dimming of light engine 425.

When the road is sufficiently dry, then light engines 420 and 425 can be returned to their pre-trigger event state by dimming up light engine 425 and dimming down light engine 420. This can be determined when the hydrometer reading drops below a threshold value and when a certain period of time passes. The certain period of time may also be a function of the temperature within the housing, which may also be measured. A photodiode can also measure the light reflected off the surface directly below the luminaire. When the reflectance drops below a certain value, the light engines can be returned to their pre-trigger state.

A particulate sensor may be used to measure the dust content of the air. If the dust content is measured to be greater than a certain value, then light engine 420 can be dimmed up and light engine 425 can be dimmed down (or turned off). In this way, the high angle light from light engine 425 is lowered to increase visibility. In some embodiments, the amount that light engine 420 is dimmed up and/or the amount light engine 425 is dimmed down can be proportional to the amount of dust in the air detected by the dust sensor. When the dust level returns to normal, then light engine 420 can be dimmed down and light engine 425 can be dimmed up (or turned on). A similar scenario can occur during foggy weather.

Sensors may also detect motion, dust, rain, daylight, darkness, ice, and/or humidity and adaptively control operation of the various light engines in the luminaire.

In some embodiments, process 1200 can be used to control operation of light engine in luminaire 705 in FIG. 7. Suppose luminaire 705 includes a first light engine that produces inner zone light distribution 805 that illuminates the portion of parking area 702 nearest building 701 and a second light engine that produces outer zone light distribution 810 that illuminates the portion of parking area 702 farthest from building 701.

During operation, for example, the first light engine can be turned on (but perhaps not at full power) and the second light engine turned off (such as might be the case at night). A presence detector such as, for example, an infrared sensor can provide a trigger event when motion is detected within the outer zone light distribution 810 area. In response to this trigger event, the first light engine can be dimmed up (if it was dimmed down to start with) and the second light engine can be activated so as to illuminate the outer zone light distribution 810. This illumination pattern can be maintained until the presence detector no longer detects motion in the area, when a predetermined period of time passes, and/or when the temperature within the luminaire reaches a threshold, after which the first light engine can be dimmed down again and the second light engine can be de-activated.

In some embodiments, a luminaire can dim up, dim down, turn on or turn off at least two light engines disposed within the luminaire in response to instructions received wireless through an embedded receiver. For example, a central computer can dim up one light engine and dim down a second light engine in response to any number of conditions. For example, the light engines can be adjusted if it is known that the roads are icy.

In some embodiments, the time of day or a photodiode can be used in conjunction with another sensor to trigger events when to separately dim up, dim down, turn on or turn off two distinct light engines. Moreover, in some embodiments, an internal temperature sensor may also be a trigger event when to dim down light sources due to potential overheating, and/or dim up light sources when the risk for overheating has dissipated.

Figure 13:
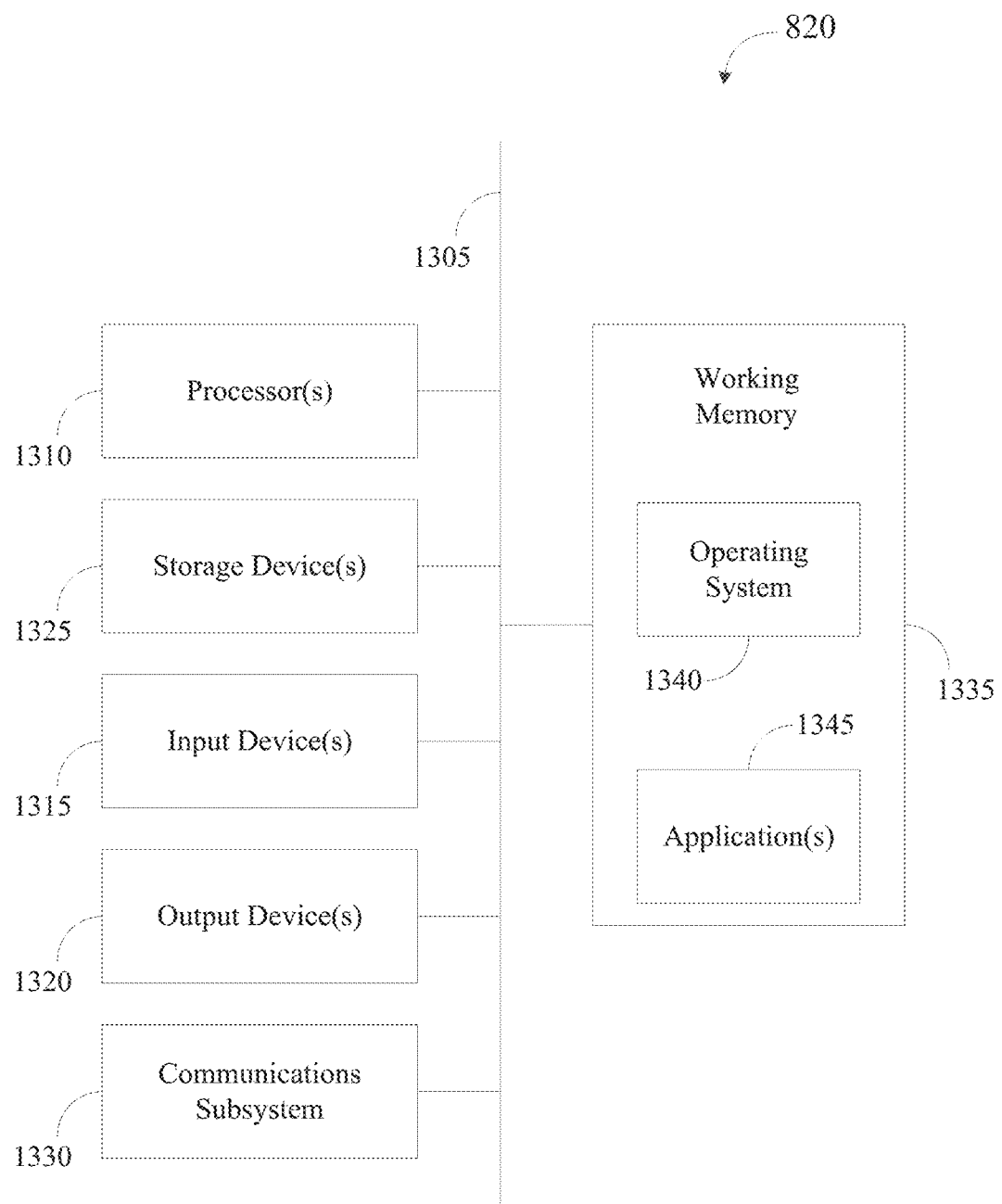
FIG. 13 shows an illustrative computational system for performing functionality to facilitate implementation of embodiments described herein.

Computational system 1300, shown in FIG. 13 can be used to perform any of the embodiments of the invention. For example, computational system 1300 can be used to execute process 1200. As another example, computational system 1300 can be used to perform any calculation, identification and/or determination described here. Computational system 1300 includes hardware elements that can be electrically coupled via a bus 1305 (or may otherwise be in communication, as appropriate). The hardware elements can include one or more processors 1310, including without limitation one or more general-purpose processors and/or one or more special-purpose processors (such as digital signal processing chips, graphics acceleration chips, and/or the like); one or more input devices 1315, which can include without limitation a mouse, a keyboard and/or the like; and one or more output devices 1320, which can include without limitation a display device, a printer and/or the like.

The computational system 1300 may further include (and/or be in communication with) one or more storage devices 1325, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 1300 might also include a communications subsystem 1330, which can include without limitation a modem, a network card (wireless or wired), an infrared communication device, a wireless communication device and/or chipset (such as a Bluetooth device, an 802.6 device, a WiFi device, a WiMax device, cellular communication facilities, etc.), and/or the like. The communications subsystem 1330 may permit data to be exchanged with a network (such as the network described below, to name one example), and/or any other devices described herein. In many embodiments, the computational system 1300 will further include a working memory 1335, which can include a RAM or ROM device, as described above.

The computational system 1300 also can include software elements, shown as being currently located within the working memory 1335, including an operating system 1340 and/or other code, such as one or more application programs 1345, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1325 described above.

In some cases, the storage medium might be incorporated within the computational system 1300 or in communication with the computational system 1300. In other embodiments, the storage medium might be separate from a computational system 1300 (e.g., a removable medium, such as a compact disc, etc.), and/or provided in an installation package, such that the storage medium can be used to program a general purpose computer with the instructions/code stored thereon. These instructions might take the form of executable code, which is executable by the computational system 1300 and/or might take the form of source and/or installable code, which, upon compilation and/or installation on the computational system 1300 (e.g., using any of a variety of generally available compilers, installation programs, compression/decompression utilities, etc.) then takes the form of executable code.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A luminaire comprising:
   at least two light engines, wherein each light engine comprises
      inner zone optics that produce an inner zone light distribution, and
      outer zone optics that produce an outer zone light distribution;
   a sensor;
   a controller communicatively coupled with the sensor and the at least two light engines, wherein the controller is configured to:
      determine when a trigger event occurs based on data from the sensor; and
      change a color of at least one of the at least two light engines.

2. The luminaire of claim 1, wherein the inner zone light distribution and the outer zone light distribution do not overlap.

3. The luminaire of claim 1, wherein the sensor comprises at least one selected from the group of a particulate sensor, a rain sensor, a temperature sensor, a daylight sensor, a humidity sensor, a luminance sensor, a motion sensor, and an input for manual control.

4. The luminaire of claim 1, wherein the trigger event occurs when a variable detected by the sensor reaches a threshold value.

5. A luminaire comprising:
   a sensor;
   a first light engine, comprising inner zone optics that produce an inner zone light pattern;
   a second light engine, comprising outer zone optics that produce an outer zone light pattern, wherein the inner zone light pattern and the outer zone light pattern do not overlap;
   an initial state where the first light engine emits light for a first distribution and the second light engine emits light for a second distribution;
   an alternate state where (i) the first light engine emits light for a third distribution and (ii) the second light engine emits light for a fourth distribution; and
   a controller communicatively coupled with the sensor, the first light engine, and the second light engine, wherein:
      the controller receives input from the sensor to determine whether a trigger event occurs based on the input; and
      after the trigger event has occurred, the controller changes the luminaire from the initial state to the alternate state.

6. The luminaire of claim 5, wherein the light for the third distribution comprises a different color compared to the light for the first distribution.

7. The luminaire of claim 5, wherein the light for the fourth distribution comprises a different color compared to the light for the second distribution.

8. The luminaire of claim 5, wherein the sensor comprises a particulate sensor.

9. The luminaire of claim 5, wherein the sensor comprises at least one selected from the group of a particulate sensor, a rain sensor, a temperature sensor, a daylight sensor, a humidity sensor, a luminance sensor, a motion sensor, and an input for manual control.

10. The luminaire of claim 5, wherein the trigger event occurs when a variable detected by the sensor surpasses a threshold value.

11. The luminaire of claim 10, wherein the controller changes the luminaire from the alternate state to the initial state after the variable detected by the sensor decreases below the threshold value.

12. The luminaire of claim 5, further comprising a proportional state wherein the controller adjusts a property of the emitted light for at least one of the first light engine and the second light engine in proportion to a variable detected by the sensor.

13. A luminaire comprising:
   a luminaire housing;
   two light engines disposed within the luminaire housing;
   a sensor, disposed within the luminaire housing, that is one of a particulate sensor, a rain sensor, a temperature sensor, or a hydrometer; and
   a controller, disposed within the luminaire housing, that is communicatively coupled with the sensor and the two light engines, wherein the controller is configured to dim up, dim down, turn on, or turn off one of the two light engines in response to an input from the sensor.

14. The luminaire of claim 13, further comprising a receiver, disposed within the luminaire housing, that is communicatively coupled with the controller, and wherein the controller is configured to dim up, dim down, turn on, or turn off the other of the two light engines in response to an input from the receiver.

15. The luminaire of claim 13, wherein the sensor is a hydrometer, and:
   at an initial time, the one of the two light engines is configured to provide an initial luminance;
   the controller is configured to monitor the hydrometer until the input from the hydrometer exceeds a predetermined threshold value at a second time;
   the controller is configured to dim down the one of the two light engines to provide a dimmed luminance in response from the input from the hydrometer exceeding the predetermined threshold value;
   the controller is configured to monitor:
      the hydrometer, and
      passage of a predetermined period of time,
      until a third time, at which the predetermined period of time has passed and input from the hydrometer is less than the predetermined threshold value; and
   the controller is configured to dim up the one of the two light engines to provide the initial luminance at the third time.

16. The luminaire of claim 15, wherein the controller is configured to dim up the other of the two light engines at the second time and dim down the other of the two light engines at the third time.

* * * * *